United States Patent [19]
Mayer

[11] Patent Number: 4,803,503
[45] Date of Patent: Feb. 7, 1989

[54] THERMALLY ACTIVATED ELECTROSTATIC CHARGING METHOD AND SYSTEM

[75] Inventor: Edward F. Mayer, Cromwell, Conn.

[73] Assignee: Ricoh Corporation, San Jose, Calif.

[21] Appl. No.: 125,896

[22] Filed: Nov. 27, 1987

[51] Int. Cl.[4] .............................................. G01D 15/00
[52] U.S. Cl. ................................ 346/159; 315/111.81
[58] Field of Search .................. 346/158, 159, 76 PH; 315/5.23, 111.91, 111.81; 313/19, 543, 341; 314/89; 358/300; 101/DIG. 13; 400/119, 120; 250/325, 423 R, 423 F; 219/216 PH

[56] References Cited

U.S. PATENT DOCUMENTS

| | | | |
|---|---|---|---|
| 2,985,786 | 5/1981 | Humphrey | 313/543 |
| 4,558,334 | 12/1985 | Foland | 315/111.91 |
| 4,684,848 | 8/1987 | Kaufman | 315/111.91 |

*Primary Examiner*—Arthur G. Evans
*Attorney, Agent, or Firm*—Flehr, Hohbach, Test, Albritton & Herbert

[57] ABSTRACT

An electrostatic charging system that incorporates a thermally activated glow discharge ion generating technique. An large AC potential is applied between a pair of spaced apart electrodes. A heater disposed near the electrode pair gap is selectively activated to heat the gases in the region of gap to induce ionization. A DC potential applied to a third electrode draws the ionized particles toward a dielectric material to place an electrostatic charge thereon.

18 Claims, 1 Drawing Sheet

THERMALLY ACTIVATED ELECTROSTATIC CHARGING METHOD AND SYSTEM

The present invention relates generally to electrostatic transfer printing. More particularly, the invention relates to a thermally activated glow discharge ion source that develops sufficient ionization to form an electrostatic image on a dielectric member.

A wide variety of techniques are known to produce electrostatic images. In such systems charged particles must be generated and applied to a dielectric material in order to form the electrostatic image. Conventional ion generating approaches include air gap breakdown, corona discharges, spark discharges, and glow discharge techniques. Each system has advantages and disadvantages. However, glow discharge ion generating techniques have been found particularly useful for dot matrix transfer printers and the like which place dots of charge onto a dielectric surface to form an image containing either written material or a desired figure or pattern. The electrostatic images can be developed by a wide variety of conventional techniques to render a visible and permanent image.

Glow discharge ion generating techniques are well known and have been widely described in a number of issued patents including U.S. Pat. Nos. 4,155,093, 4,365,549 and 4,558,334. As described therein, glow discharge type ion generators typically incorporate a high frequency high voltage (on the order of several thousand volts) alternating exitation potential that is applied across a pair of spaced apart ionization electrodes in order to ionize the air gap between the electrodes. To apply an electrostatic charge to a dielectric material, a DC extraction voltage, typically on the order of 200-300 V is selectively placed on a backing electrode disposed opposite the spaced apart ionization electrodes located on the opposing side of the dielectric material. When the extraction voltage is applied to the backing electrode, a field is created drawing the ionized particles into contact with dielectric material thereby depositing the desired electrostatic charge. By switching on the extraction potential anytime an electrostatic dot is desired, the desired image can be formed.

While an effective transfer printer can be fabricating using such a method, such printers must be capable of switching the large DC extraction voltages on and off. This requires transistors capable of switching voltages on the order of several hundred volts. While such transistors do exist, they are relatively expensive and since a large number are required in typical applications, it would be desirable to provide a system which reduces the need to switch such large voltages.

Accordingly, it is a primary objective of the present invention to provide a thermally activated electrostatic imaging device that incorporates selective heating to enhance air gap ionization.

Another objective of the present invention is to provide a thermally activated glow discharge type ion generating device and method.

Another objective of the present invention is to provide a glow discharge type ion generating method that does not require the switching of high voltage DC currents.

To achieve the foregoing and other objects in accordance with the purpose of the present invention, a method of and apparatus for generating ions using a thermally activated glow discharge system is disclosed.

A time varying potential is applied between a pair of spaced apart electrodes having a gap therebetween. The gases in the gap between the electrodes are selectively heated sufficiently to generate ions in the vicinity of the gap.

The frequency and magnitude of the time varying potential are preferably selected such that substantially no ionization occurs unless the gases in the region of the gap have been heated.

Preferably, a second potential is applied to a third electrode to draw the ionized particles toward a dielectric material, thereby depositing an electrostatic charge on the dielectric material.

In a preferred method for utilizing the invention a transfer printer is provided wherein the dielectric material takes the form of a sheet of dielectric paper that is moved past the electrodes.

In a preferred apparatus aspect of the invention a plurality of heaters are individually selectively activated to induce ionization in the immediate vicinity of the particular heater activated.

The features of the present invention that are believed to be novel are set forth with particularity in the appended claims. The invention, together with further objects and advantages thereof, may best be understood by reference to the following description when taken in conjunction with accompanying drawings in which:

Figure 1:
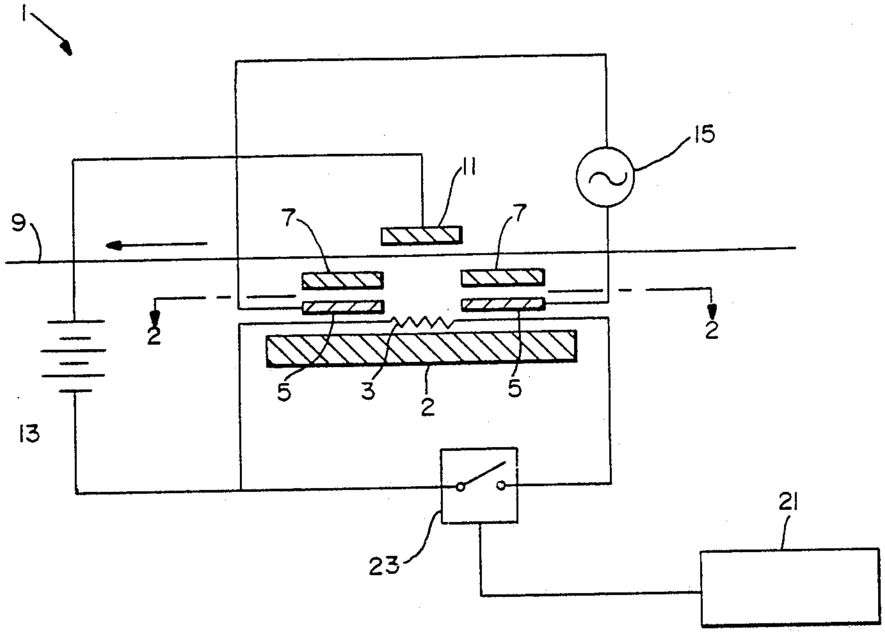
FIG. 1 is a schematic cross sectional view of an electrostatic transfer printer print bar fabricated in accordance with the invention.
Figure 2:
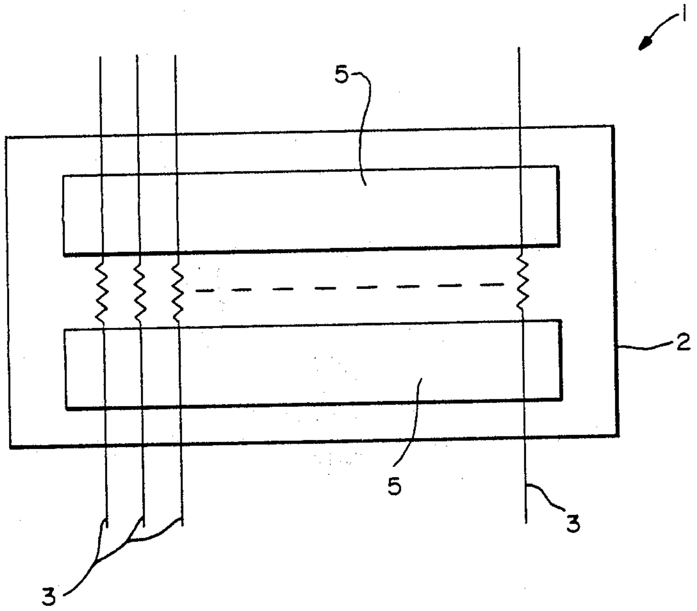
FIG. 2 is a schematic view of the electrostatic transfer printer shown in FIG. 1 taken across Section 2—2 as shown in FIG. 1 of the dielectric material.

It is well known that the application of a high voltage alternating current to spaced apart electrodes can cause the air in the gap between the electrodes to become ionized after a certain critical voltage is attained. Above the critical voltage, ions are readily generated, while below the critical voltage substantially no ionization occurs. Indeed, standard glow discharge type ion generators rely on this principle to initiate ionization. The physics of air suggests that the higher the air temperature is raised, the lower the critical voltage that must be applied in order to induce ionization. Therefore, it has been discovered that it is possible to modulate the output of an ion generator by rapidly varying the temperature of air in the vicinity of a high AC field. The intent of the present invention is to provide a device capable of thermally modulating the output of an ion generator used to place an electrostatic charge on a dielectric material. As illustrated in the drawings, the embodiment of the thermally activated electrostatic charging system described herein takes the form of a transfer printer.

The thermally activated transfer printer includes a print bar 1 along with a number of conventional process stations including a developer (not shown) that converts an electrostatic image deposited on a dielectric material into a visible and permanent image. The print bar 1 is adapted to place an electrostatic image on a dielectric material. The print bar consists of a support base 2 that carries a multiplicity of heaters 3, a pair of spaced apart charging electrodes 5 having a gap 6 therebetween, and a pair of insulators 7. A dielectric material such as paper 9 is passed by print bar 1 adjacent to insulators 7 which shield charging electrodes 5 from the dielectric paper 9. Backing electrode 11 is positioned on the opposite side of dielectric paper 9 opposite the gap 6 between charging electrodes 5. DC power supply 13 supplies a constant potential of several hundred volts to backing electrode 11. An alternating power supply 15 places a high voltage alternating potential between the charging electrodes 5. The voltage and frequency supplied to charging electrodes 5 is adjusted so that the field it generates will not cause spontaneous ionization of air in the region of gap 6. By way of example, appropriate frequencies and voltages for a device to be used in an air environment are a voltage in the range of 100–500 volts peak to peak at a frequency in the approximate range of 10 kHz to 100 mHz. A DC power supply 13 places a constant extraction potential of several hundred volts behind the dielectric paper 9, thereby creating a field in the gap area 6 between charging electrodes 5 and the resistive heater 3. In the event of ionization of particles in the area between charging electrodes 5, the extraction potential drains the ionized particles toward the dielectric paper 9.

In order to deposit an image on the surface of dielectric paper 9, a sequence controller 21 activates a switch 23 which in turn provide the power necessary to heat resistive heater 3. When activated, heater 3 heats the gases (generally air) in the region between spaced apart charging electrodes 5 sufficiently to induce ionization. By way of example, resistive heater 3 may be a thermal print bar of a type similar to those produced by Ricoh Corporation. For a transfer printer that includes a gap of approximately 6 mils between charging electrodes 5, a resistive heater pulsed for about 100 micro-seconds at a voltage in the vicinity of 10–20 volts would create sufficient ionization to deposit an electrostatic dot on the dielectric material.

Since the print bar 1 includes a multiplicity of side-by-side heaters 3, a corresponding number of switches 23 are provided, with each switch being associated with a single heater. Therefore, a two dimensional image can be formed by passing a sheet of dielectric paper over the print bar 1 and causing sequence controller 21 to activate switches 3 and therefore heaters 3 in a selected sequence for the time necessary to deposit a dot of electrostatic charge on the dielectric paper 9 in accordance with conventional techniques.

In order to form higher resolution images, the print bar 1 could take the form of a two dimensional dot matrix head similar in concept to the conventional two-dimensional arrays such as the arrays disclosed in the previously referenced U.S. Pat. Nos. 4,155,093, 4,365,549, and 4,558,334.

Although only one embodiment of the present invention has been described, it should be understood that the present invention may be embodied in many other specific forms without departing from the spirit or scope of the invention. Particularly, it will be appreciated by those skilled in the art that the thermally activated ion generation technique described herein could readily by applied to a wide variety of electrostatic charging systems beyond transfer printers. Further, the magnitude of both the alternating and direct potentials as well as frequency of the alternating current are by way of example only and may be widely varied to meet the design requirements of a particular system.

Of course the style of heaters used, as well as their intensity and activation timing may be widely varied to suit a particular design, and will to a large degree be interdependent with the nature of the fields applied by the various electrodes. Additionally, the density and arrangements of the heaters may be widely varied using conventional techniques to provide a desired resolution. Therefore, the present examples and embodiments are to be considered as illustrative and not restrictive, and the invention is not to be limited to the details given herein, but may be modified within the scope of the appended claims.

I claim:

1. A method of forming an electrostatic image on a solid dielectric material comprising the steps of:

applying a first potential to a first electrode adjacent the dielectric material, applying a time varying potential to a second electrode adjacent an opposite side of said dielectric material from said first electrode, selectively heating gases in the region of said second electrode to selectively generate ions in the region of one of said electrodes to form the electrostatic image on the dielectric material, whereby the magnitude and frequency of the time varying potential are selected such that substantially no ionization will occur unless the region between said first and second electrodes has been heated.

2. A method of forming an electrostatic image as recited in claim 1 further comprising the step of passing the dielectric material past said first and second electrodes to facilitate placing a two dimensional image on the dielectric material.

3. An electrostatic imaging apparatus comprising:

a solid dielectric member;

a first electrode adjacent the dielectric member;

a second electrode spaced apart from the first electrode;

a third electrode spaced apart from said first and second electrodes;

a heater for heating the region between said first and second electrodes;

first potential means for applying a first time varying potential between said first and second electrodes;

second potential means for applying a second potential to said third electrode;

activating means for selectively activating said heater to form an electrostatic image on the dielectric member whereby the frequency and magnitude of the potential applied by said first potential means is selected such that substantially no ionization will occur unless the activating means has activated said heater; and whereby the field created by the second potential is adapted to draw the ionized particles into contact with the dielectric material.

4. An electrostatic imaging apparatus as recited in claim 3 further comprising a plurality of aligned heaters and wherein said activating means selectively activates each of the heaters to generate ions adjacent the particular heaters activated to form an electrostatic image on the dielectric member.

5. An electrostatic imaging apparatus as recited in claim 4 further comprising developing means for creating a visible and permanent image on the dielectric material.

6. An electrostatic imaging apparatus as recited in claim 5 wherein said dielectric material is paper.

7. An electrostatic imaging apparatus as recited in claim 3 wherein said heaters are resistive heaters.

8. An electrostatic imaging apparatus as recited in claim 3 wherein said first and second electrodes are positioned on a first side of the dielectric material and said third electrode is positioned adjacent an opposite side of the dielectric member from said first electrode.

9. An electrostatic imaging apparatus as recited in claim 8 wherein a constant potential is applied to the third electrode.

10. An electrostatic imaging apparatus as recited in claim 9 further comprising a pair of spaced apart insulators location that shield the dielectric material from the first and second electrodes.

11. A method of generating ions comprising the steps of:

applying a time varying potential between a first and a second spaced apart electrodes; and selectively heating gases in the region between the first and second electrode to generate ions in that region whereby said time varying potential is selected such that substantially no ionization will occur in the region between said first and second electrodes unless the region between said first and second electrodes has been heated.

12. A method as recited in claim 11 further comprising the step of applying a second potential to a third electrode to create a field in the vicinity of the heated gases that draw the ions generated toward a dielectric material disposed adjacent the first and second electrodes for depositing an electrostatic charge on the dielectric material.

13. A method of forming an electrostatic image as recited in claim 12 further comprising the step of passing the dielectric material past said first and second electrodes to facilitate placing a two dimensional image on the dielectric material.

14. A method as recited in claim 13 wherein the dielectric material is a sheet of paper.

15. A method as recited in claim 13 further comprising the step of developing the electrostatic image to form a visible image.

16. An apparatus for generating ions comprising:

a heater and control means for selectively actuating the heater to generate ions in the region adjacent the heater when heater is activated;

a dielectric member; and means for applying an electrostatic charge to the dielectric member by drawing charged particles into contact with the dielectric member.

17. An apparatus as recited in claim 16 further comprising means for applying an alternating field in the region adjacent the heater, the alternating field not being large enough to generate substantial ionization when the heater has not been activated.

18. An apparatus as recited in claim 17 further comprising a plurality of heaters, wherein the control means can independently activate each one of said plurality of heaters to generate ions in the regions adjacent the activated heaters.

* * * * *

UNITED STATES PATENT AND TRADEMARK OFFICE

CERTIFICATE OF CORRECTION

PATENT NO. : 4,803,503

DATED : Feb. 7, 1989

INVENTOR(S) : Edward F. Mayer

It is certified that error appears in the above-identified patent and that said Letters Patent is hereby corrected as shown below:

On the title page, item [73], add --Ricoh Company, Ltd., Tokyo, Japan--
On the title page, item [57], line 3 of the Abstract, change "An" to --A--.

Col. 1, line 31, change "exitation" to --excitation--

Col. 1, line 45, change "fabrication" to --fabricated--

Col. 3, line 39, change "switches 3" to --switches 23--.

Col. 4, line 41, insert at beginning of line before "to form" --for selectively generating ions in a region adjacent to the heater--.

Signed and Sealed this

Ninth Day of January, 1990

*Attest:*

JEFFREY M. SAMUELS

*Attesting Officer* *Acting Commissioner of Patents and Trademarks*